(12) United States Patent
Hoshi et al.

(10) Patent No.: US 7,730,734 B2
(45) Date of Patent: Jun. 8, 2010

(54) COOLING APPARATUS OF A FUEL CELL VEHICLE

(75) Inventors: Jun Hoshi, Toyota (JP); Susumu Ichikawa, Kariya (JP)

(73) Assignees: Toyota Jidosha Kabushiki Kaisha, Toyota-shi (JP); Denso Corporation, Kariya-shi (JP)

( * ) Notice: Subject to any disclaimer, the term of this patent is extended or adjusted under 35 U.S.C. 154(b) by 706 days.

(21) Appl. No.: 11/578,551

(22) PCT Filed: Jan. 24, 2006

(86) PCT No.: PCT/JP2006/001393

§ 371 (c)(1),
(2), (4) Date: Oct. 16, 2006

(87) PCT Pub. No.: WO2006/082766

PCT Pub. Date: Aug. 10, 2006

(65) Prior Publication Data

US 2007/0240431 A1    Oct. 18, 2007

(30) Foreign Application Priority Data

Feb. 4, 2005    (JP) .............................. 2005-028392

(51) Int. Cl.
*B60H 1/32* (2006.01)
(52) U.S. Cl. .............................. 62/244; 165/42; 165/164
(58) Field of Classification Search .................. 62/244; 165/42–43, 140, 164–167
See application file for complete search history.

(56) References Cited

U.S. PATENT DOCUMENTS 4,651,816 A * 3/1987 Struss et al. .................. 165/76
4,938,303 A 7/1990 Schaal et al.
5,215,044 A 6/1993 Banzhaf et al.

(Continued)

FOREIGN PATENT DOCUMENTS

DE    198 43 928 A1    4/1999

(Continued)

OTHER PUBLICATIONS

"Cosmo Oil Leases First Unit of Nissan's X-Trail FCV" Released on Mar. 29, 2004 by Cosmo Oil Co., Ltd. & Nissan Motor Co., Ltd. in a website Nissan Global (http://www.nissan-global.com/).

(Continued)

*Primary Examiner*—William E Tapolcai
(74) *Attorney, Agent, or Firm*—Kenyon & Kenyon LLP

(57) ABSTRACT

A cooling apparatus of a fuel cell vehicle in which a cooling efficiency of a fuel cell cooling heat exchanger located downstream of an air conditioner external heat exchanger does not decrease. (1) In the cooling apparatus, the air conditioner external heat exchanger and the fuel cell cooling heat exchanger are partially offset from each other so that a high-temperature portion of the air conditioner external heat exchanger is not overlapped with the fuel cell cooling heat exchanger in a front view taken from a front side of the vehicle. (2) A portion of the fuel cell cooling heat exchanger extending beyond an end of the air conditioner exterior heat exchanger opposite the high-temperature portion is disposed outside a fan shroud so as to be cooled by a vehicle-running wind only.

6 Claims, 2 Drawing Sheets

U.S. PATENT DOCUMENTS

| | | |
|---|---|---|
| 6,619,379 B1 | 9/2003 | Ambros et al. |
| 6,865,901 B2 * | 3/2005 | Horn et al. .................. 62/238.6 |
| 6,951,240 B2 * | 10/2005 | Kolb ........................... 165/42 |
| 6,978,628 B2 * | 12/2005 | Honda ......................... 62/134 |
| 7,051,787 B2 | 5/2006 | Taguchi |
| 7,310,961 B2 * | 12/2007 | Hoshi et al. .................... 62/244 |
| 2004/0104007 A1 | 6/2004 | Kolb |
| 2005/0257563 A1 * | 11/2005 | Hoshi et al. .................... 62/507 |
| 2006/0096735 A1 | 5/2006 | Taguchi |

FOREIGN PATENT DOCUMENTS

| | | |
|---|---|---|
| DE | 199 28 193 A1 | 1/2000 |
| DE | 10-2005/004614 A1 | 10/2005 |
| JP | SHO57-9612 | 6/1980 |
| JP | SHO57-15721 | 3/1981 |
| JP | 2003-118396 A | 4/2003 |

OTHER PUBLICATIONS

"Nissan Leases X-Trail FCV Equipped with CO2 Air-Conditioning System" released on Mar. 29, 2004 by Nissan Motor Co., Ltd. & Calsonic Kansei Corporation in a website "Nissan Global" (http://www.nissan-global.com/).

\* cited by examiner

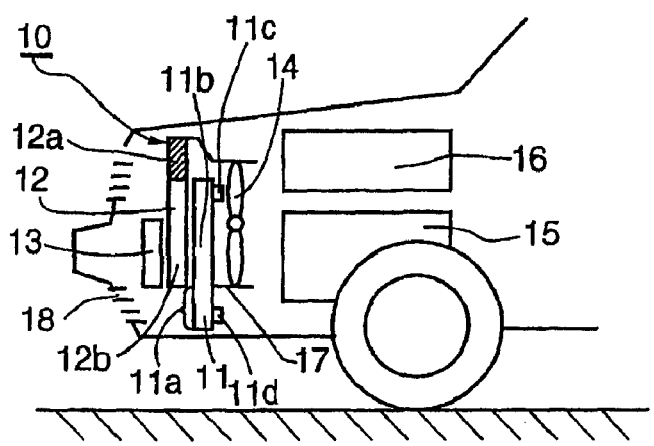
FIG. 4
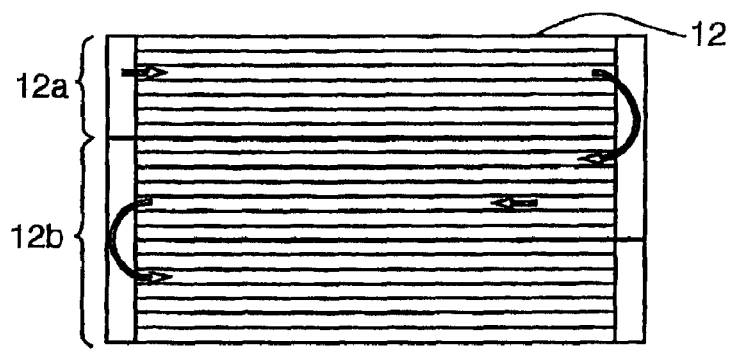
FIG. 5
FIG. 6 *PRIOR ART*
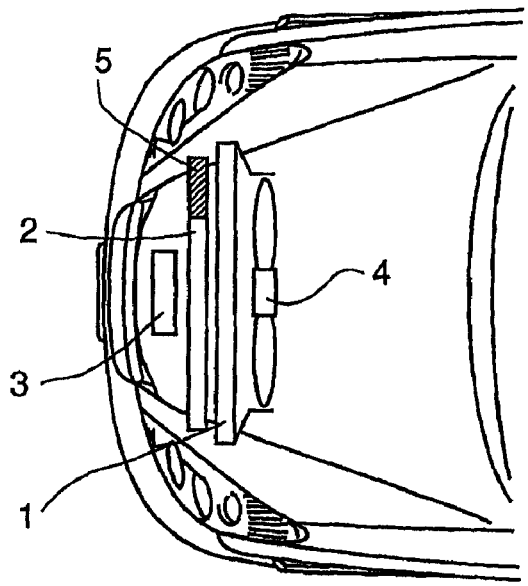

COOLING APPARATUS OF A FUEL CELL VEHICLE

This is a 371 national phase application of PCT/JP2006/301393 filed 24 Jan. 2006, claiming priority to Japanese Application No. 2005-028392filed 04 Feb. 2005, the contents of which are incorporated herein by reference.

FIELD OF THE INVENTION

The present invention relates to a cooling apparatus of a vehicle.

BACKGROUND OF THE INVENTION

Japanese Patent Publication 2003-118396 discloses a cooling apparatus of a fuel cell vehicle including an air conditioner external heat exchanger and a fuel cell cooling heat exchanger.

In the apparatus, as illustrated in FIG. 6, the air conditioner external heat exchanger 2 and the fuel cell cooling heat exchanger 1 are disposed, in that order, from an upstream toward a downstream in a flow direction of air passing through the heat exchangers. The air conditioner external heat exchanger 2 is disposed in front of the fuel cell cooling heat exchanger 1 such that an entire portion of the air conditioner external heat exchanger 2 is overlapped with the fuel cell cooling heat exchanger 1 in a front view of the heat exchangers when viewed from a front side of the vehicle.

FIG. 6 also shows that an electric vehicle system cooling heat exchanger 3 is disposed in front of the air conditioner external heat exchanger 2 and a cooling fan 4 is disposed on a rear side of the fuel cell cooling heat exchanger 1.

However, in an air conditioning system using $CO_2$ coolant, during a cooling operation, a portion (a portion denoted with reference numeral 5 in FIG. 6) adjacent an inlet of the air conditioner external heat exchanger becomes higher in temperature than a cooling water in the fuel cell cooling heat exchanger located on the rear side of the air conditioner external heat exchanger, so that the fuel cell cooling heat exchanger is warmed by the high-temperature portion of the air conditioner external heat exchanger located in front of the fuel cell cooling heat exchanger. As a result, a cooling efficiency of the fuel cell cooling heat exchanger decreases at a region located on the rear side of the high temperature portion of the air conditioner external heat exchanger.

SUMMARY OF THE INVENTION

An object of the present invention is to provide a cooling apparatus of a fuel cell vehicle in which, though an air conditioner external heat exchanger and a fuel cell cooling heat exchanger are located, in that order, in a flow direction of air passing through the heat exchangers, a cooling efficiency of the fuel cell cooling heat exchanger located downstream of the air conditioner external heat exchanger does not decrease.

The above-described object is achieved by the present invention as follows:

(1) A cooling apparatus of a fuel cell vehicle includes:
a fuel cell cooling heat exchanger; and
an air conditioner external heat exchanger having a high-temperature portion.

The air conditioner external heat exchanger is disposed upstream of the fuel cell cooling heat exchanger in a passing air flow direction, and the air conditioner external heat exchanger and the fuel cell cooling heat exchanger are partially offset from each other so that the high-temperature portion of the air conditioner external heat exchanger is not overlapped with the fuel cell cooling heat exchanger in a front view taken from a front side of the vehicle.

(2) A cooling apparatus of a fuel cell vehicle includes:
a fuel cell cooling heat exchanger; and
an air conditioner external heat exchanger having a high-temperature portion.

The air conditioner external heat exchanger is disposed upstream of the fuel cell cooling heat exchanger in a passing air flow direction, and the air conditioner external heat exchanger and the fuel cell cooling heat exchanger are partially offset from each other so that the high-temperature portion of the air conditioner external heat exchanger is not overlapped with the fuel cell cooling heat exchanger in a front view taken along a cooling wind flowing direction to the fuel cell cooling heat exchanger.

(3) A cooling apparatus of a fuel cell vehicle according to any one of items (1) and (2) above, wherein the fuel cell cooling heat exchanger has a portion extending out from an end, opposite the high-temperature portion, of the air conditioner external heat exchanger in the front view, and the extending-out portion of the fuel cell cooling heat exchanger is disposed outside a fan shroud so that the extending-out portion is cooled by a vehicle-running wind only.

(4) A cooling apparatus of a fuel cell vehicle according to any one of items (1) to (3) above, wherein coolant of the air conditioner is $CO_2$ and the high-temperature portion of the air conditioner external heat exchanger is defined as a portion where a temperature of the $CO_2$ coolant is higher than a temperature of fuel cell cooling water.

(5) A cooling apparatus of a fuel cell vehicle according to item (3) above, wherein the fan shroud is disposed so as to surround the air conditioner external heat exchanger.

(6) A cooling apparatus of a fuel cell vehicle according to any one of items (1) and (2) above, wherein the fuel cell cooling heat exchanger includes a coolant inlet and a coolant outlet, the coolant inlet of the fuel cell cooling heat exchanger being located on a higher-temperature side of air having passed through the air conditioner external heat exchanger.

Technical advantages of the present invention are as follows:

According to the cooling apparatus of a fuel cell vehicle of items (1), (2), (4) and (6) above, since the high-temperature portion of the air conditioner external heat exchanger is offset from and is located outside a region in front of the fuel cell cooling heat exchanger, the air which has passed through the high-temperature portion of the air conditioner external heat exchanger and has been warmed does not flow though a core of the fuel cell cooling heat exchanger, so that a cooling strength of the fuel cell cooling heat exchanger does not decrease.

According to the cooling apparatus of a fuel cell vehicle of items (3), (4) and (5) above, since the portion of the fuel cell cooling heat exchanger extending out from the end of the air conditioner external heat exchanger opposite the high-temperature portion in the front view is disposed outside the fan shroud, the air conditioner external heat exchanger can be cooled as necessary without enlarging the cooling fan.

The portion of the fuel cell cooling heat exchanger disposed outside the fan shroud is cooled by vehicle-running wind. In the cooling by vehicle-running wind, the cooling ability increases at a vehicle high-speed range. On the other hand, a fuel cell requires a large cooling strength at the vehicle high-speed range. Accordingly, cooling of the portion of the fuel cell cooling heat exchanger located outside the fan shroud by vehicle-running wind coincides with the required cooling strength of the fuel cell, so that it is possible to effectively cool the fuel cell at the high-speed range.

At a vehicle low-speed range and an idling range, a required cooling strength of the fuel cell is small, so that a portion of the fuel cell cooling heat exchanger located inside the fan shroud can cool the fuel cell sufficiently by wind sucked by the fan, and no problem happens.

BRIEF DESCRIPTION OF THE DRAWINGS

FIG. 4 is a side elevational view of a cooling apparatus of a fuel cell vehicle according to Embodiment 3 of the present invention.

FIG. 5 is a front elevational view of an air conditioner external heat exchanger of the cooling apparatus of a fuel cell vehicle according to Embodiment 3 of the present invention.

FIG. 6 is a plan view of a conventional cooling apparatus of a fuel cell vehicle.

DETAILED DESCRIPTION OF PREFERRED EMBODIMENTS

A cooling apparatus of a fuel cell vehicle according to the present invention will now be explained with reference to FIGS. 1-5.

Figure 1:
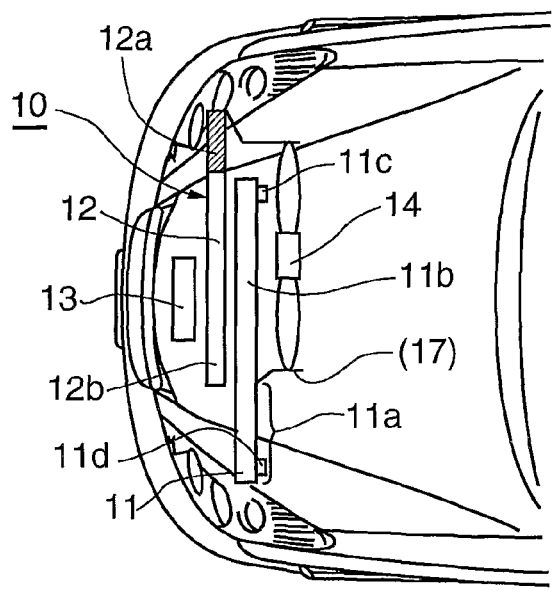
FIG. 1 is a plan view of a cooling apparatus of a fuel cell vehicle according to Embodiment 1 of the present invention.
Figure 2:
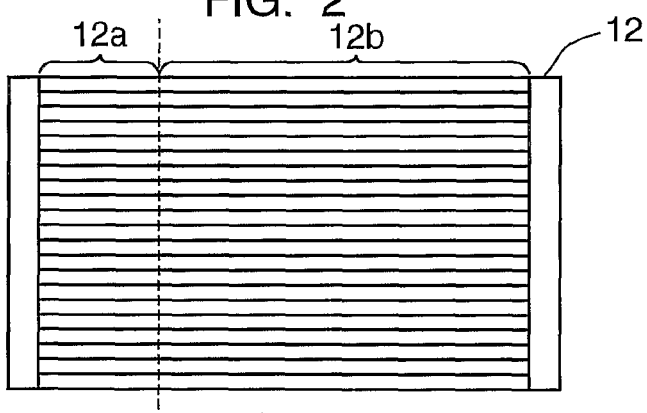
FIG. 2 is a front elevational view of an air conditioner external heat exchanger of the cooling apparatus of a fuel cell vehicle according to Embodiment 1 of the present invention.
Figure 3:
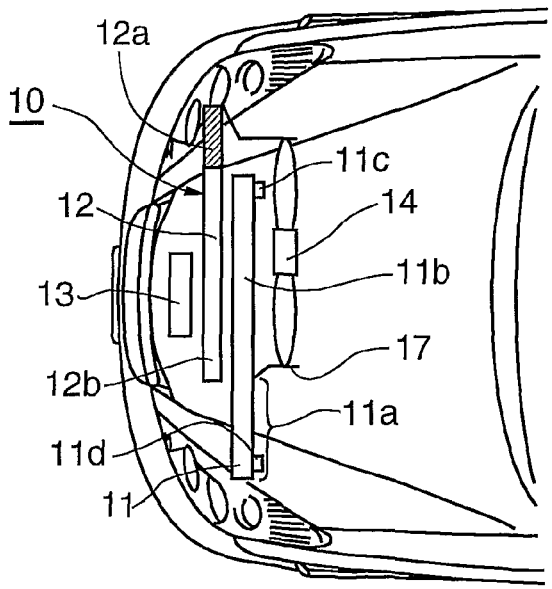
FIG. 3 is a plan view of a cooling apparatus of a fuel cell vehicle according to Embodiment 2 of the present invention.

FIGS. 1 and 2 illustrate Embodiment 1 of the present invention, FIG. 3 illustrates Embodiment 2 of the present invention, and FIGS. 4 and 5 illustrate Embodiment 3 of the present invention.

Portions generic or common throughout all of the embodiments of the present invention are denoted with the same reference numerals throughout all of the embodiments of the present invention.

[Structures and Effects Common Throughout All of the Embodiments of the Present Invention]

First, structures common throughout all of the embodiments of the present invention will be explained with reference to FIGS. 1, 2 and 4.

As illustrated in FIG. 1, a cooling apparatus 10 of a fuel cell vehicle according to the present invention includes a fuel cell cooling heat exchanger 11, an air conditioner external heat exchanger 12 and a cooling fan 14. The cooling apparatus 10 of a fuel cell vehicle includes, usually, an EV (Electric Vehicle) system cooling heat exchanger 13.

In the fuel cell vehicle, a fuel cell stack 15 and an inverter 16 are installed on a rear side of the cooling fan 14. A coolant (usually, cooling water) of the fuel cell 15 is circulated through a piping to the fuel cell cooling heat exchanger 11 where the coolant is heat-exchanged with the environmental air passing through the heat exchanger and is cooled. A coolant for cooling the inverter 16 and a motor for driving a wheel is circulated through a piping to the EV system cooling heat exchanger 13, where the coolant is heat-exchanged with the air passing through the heat exchanger and is cooled. A coolant of the air conditioner is $CO_2$. The $CO_2$ coolant is circulated to the air conditioner external heat exchanger 12, at which the $CO_2$ coolant is heat-exchanged with the air passing through the heat exchanger.

The fuel cell cooling heat exchanger 11, the air conditioner external heat exchanger 12, the cooling fan 14 and the EV system cooling heat exchanger 13 are disposed in a front compartment of the fuel cell vehicle.

The environmental air passing through the heat exchanger includes the fan sucking wind and the vehicle-running wind.

A required cooling strength of the fuel cell 15 is large at a vehicle high-speed range and is small at a vehicle low-speed range and an idling state.

A required cooling strength of the air conditioner is substantially constant irrespective of the vehicle speed.

The fuel cell cooling heat exchanger 11, the air conditioner external heat exchanger 12 and the cooling fan 14 are disposed in the order of the air conditioner external heat exchanger 12, the fuel cell cooling heat exchanger 11 and the cooling fan 14 in a front-to-rear direction of the vehicle. Accordingly, the air conditioner external heat exchanger 12 is located upstream of the fuel cell cooling heat exchanger 11 along a passing air flow direction.

When the EV system cooling heat exchanger 13 is provided, the EV system cooling heat exchanger 13 is disposed in front of the air conditioner external heat exchanger 12, i.e., upstream of the air conditioner external heat exchanger 12 in the passing air flow direction.

In an air conditioner system using $CO_2$ coolant, during cooling operation, a portion 12a adjacent an inlet of the air conditioner external heat exchanger 12 becomes higher in temperature of the $CO_2$ coolant than a water temperature of the fuel cell cooling heat exchanger 11 located on a rear side of the air conditioner external heat exchanger 12. That portion 12a of the air conditioner external heat exchanger 12 using $CO_2$ coolant where the coolant temperature becomes higher than the water temperature of the fuel cell cooling heat exchanger 11 will be referred to hereinafter as a high-temperature portion 12a.

The air conditioner external heat exchanger 12 and the fuel cell cooling heat exchanger 11 are partially offset from each other so that the high-temperature portion 12a of the air conditioner external heat exchanger 12 is not overlapped with the fuel cell cooling heat exchanger 11 in a front elevational view taken from a front side of the vehicle. A portion 12b other than the high-temperature portion 12a, of the air conditioner external heat exchanger 12 may be overlapped with a portion of the fuel cell cooling heat exchanger 11 in the front view. In the embodiment shown, the portion 12b other than the high-temperature portion 12a of the air conditioner external heat exchanger 12 is overlapped with a portion 11b (located inside a fan shroud 17 described later) of the fuel cell cooling heat exchanger 11 in the front view. The partial offsetting of the air conditioner external heat exchanger 12 from the fuel cell cooling heat exchanger 11 is achieved by partially offsetting the air conditioner external heat exchanger 12 relative to the fuel cell cooling heat exchanger 11 in a right-and-left (transverse) direction of the vehicle or in a vertical direction of the vehicle. In embodiments, offsetting may be performed in both the right-and-left direction and the vertical direction.

A fan shroud 17 is provided to the cooling fan 14. The fan shroud 17 extends from a contour of the air conditioner external heat exchanger 11 toward the cooling fan 14 so that an entire amount of the wind sucked by the cooling fan 14 flows through the air conditioner external heat exchanger 11. The fan shroud 17 is disposed so as to surround the contour of the air conditioner external heat exchanger 12.

Since the air conditioner external heat exchanger 12 and the fuel cell cooling heat exchanger 11 are offset from each other, a portion 11a of the fuel cell cooling heat exchanger 11 which is not overlapped with the air conditioner heat exchanger 12 in the front view extends from the fan shroud 17 beyond the air conditioner external heat exchanger 12. In the embodiment shown, the portion 11a of the fuel cell cooling heat exchanger 11 extending from a portion opposite the high-temperature portion 12a of the air conditioner external heat exchanger 12 in the front view is caused to extend out from the fan shroud 17 so as to oppose a ram pressure opening of the vehicle. The portion 11a of the fuel cell cooling heat exchanger 11 is cooled by the vehicle-running wind only. The fan-sucking wind does not flow through that portion 11a.

A required cooling strength of the fuel cell is small at a low-speed range of the vehicle and is large at a high-speed range of the vehicle.

A portion 11b located inside the fan shroud 17, of the fuel cell cooling heat exchanger 11 has such a core area as can satisfy the required cooling ability at the time of the low-speed running and idling. Little cooling of the portion 11a located outside the fan shroud 17 can be expected at the time of a low-speed running of the vehicle, and cooling cannot be expected at all when the vehicle stops.

The portion 11a of the fuel cell cooling heat exchanger 11 located outside the fan shroud 17 has such a core area and a cooling ability as can satisfy the required cooling ability at the time of high-speed running, in cooperation with the portion 11b located inside the fan shroud 17. Since the amount of the vehicle-running wind is large and the speed of the vehicle-running wind is high at the time of high-speed running, the amount and the speed of the vehicle-running wind passing through that portion 11a located outside the fan shroud 17 also become large at the time of high-speed running, which coincides with the required cooling strength of the fuel cell that becomes large at the time of high-speed running, because a power generating amount of the fuel cell becomes large at the time of high-speed running and thus the cooling strength required for cooling the fuel cell becomes large at the time of high-speed running.

The fuel cell cooling heat exchanger 11 includes a coolant inlet 11c and a coolant outlet 11d. The coolant inlet 11c is located on a higher-temperature side of air having passed through the air conditioner external heat exchanger 12. The coolant outlet 11d is located on a lower-temperature side of the air having passed through the air conditioner external heat exchanger 12 or at the portion 11a of the fuel cooling heat exchanger 11 extending beyond the end opposite the high-temperature portion 12a of the air conditioner external heat exchanger in the front view.

Operation and technical advantages of the present invention will now be explained.

In the cooling apparatus 10 of a fuel cell vehicle, since the high-temperature portion 12a of the air conditioner external heat exchanger 12 is offset from the front space of the fuel cell cooling heat exchanger 11, the wind which has passed the high-temperature portion 12a of the air conditioner exterior heat exchanger 12 and has been warmed does not flow through the core of the fuel cell cooling heat exchanger 11 and does not heat the fuel cell cooling heat exchanger 11. As a result, the cooling ability of the portion 11b of the fuel cell cooling heat exchanger 11 will not decrease.

Further, since a portion of the air conditioner external heat exchanger located in front of the fuel cell cooling heat exchanger 11 is the remaining portion 12b other than the high-temperature portion 12a, of the air conditioner external heat exchanger 12, a difference between a temperature of the wind which has passed through the portion 12b of the air conditioner external heat exchanger 12 and flows through the portion 11b of the fuel cell cooling heat exchanger 11 located inside the fan shroud and a temperature of the cooling water which flows in the portion 11b of the fuel cell cooling heat exchanger inside the fan shroud is large. As a result, heat dissipation at the portion 11b of the fuel cell cooling heat exchanger 11 located inside the fan shroud is improved.

Further, in the cooling apparatus 10 of the fuel cell vehicle according to the present invention, since the portion 11a of the fuel cell cooling heat exchanger 11 extending beyond the end opposite the high-temperature portion 12a of the air conditioner external heat exchanger 12 in the front view is disposed outside the fan shroud 17, the fan shroud 17 is not required to cover the area of both the air conditioner external heat exchanger 12 and fuel cell cooling heat exchanger 11 but is required to cover only the area of the air conditioner external heat exchange 12. As a result, the air conditioner external heat exchanger 12 can be cooled as necessary by the cooling fan 14 without enlarging the fan shroud 17 and the cooling fan 14 as compared with the conventional apparatus.

Further, the portion 11a disposed outside the fan shroud 17 (disposed at the ram pressure opening portion), of the fuel cell cooling heat exchanger 11 is cooled by the vehicle-running wind. Since the cooling by the vehicle-running wind increases at a high-speed range of the vehicle due to an increase in the amount and speed of wind, the cooling ability of the portion 11a disposed outside the fan shroud 17 increases. On the other hand, since the amount of power and heat generated by the fuel cell becomes large at the high-speed range, the cooling strength required for the fuel cell is large. The cooling of the portion 11a of the fuel cell cooling heat exchanger 11 disposed outside the fan shroud 17 by the vehicle-running wind coincides with the required cooling strength of the fuel cell, so that at the high-speed range, an effective cooling of the fuel cell is conducted.

At a low-speed range and an idling range of the vehicle, the required cooling strength of the fuel cell is small, the fuel cell can be sufficiently cooled by the wind sucked by the cooling fan 14 and flowing through the portion 11b of the fuel cell cooling heat exchanger 11 disposed within the fan shroud 17.

Next, structures and the effects and technical advantages unique to each embodiment of the present invention will be explained.

Embodiment 1

FIGS. 1 and 2

In Embodiment 1 of the present invention, as illustrated in FIGS. 1 and 2, the partial offsetting of the air conditioner external heat exchanger 12 and the fuel cell cooling heat exchanger 11 to each other is performed by partially offsetting the air conditioner external heat exchanger 12 and the fuel cell cooling heat exchanger 11 to each other in a right-and-left direction of the vehicle. In Embodiment 1 of the present invention, the fan shroud 17 does not need to be provided.

With effects and technical advantages of Embodiment 1 of the present invention, since the front compartment of the vehicle has a width greater than a height of the vehicle, the air conditioner external heat exchanger 12 and the fuel cell cooling heat exchanger 11 can be easily offset in the right-and-left direction of the vehicle.

Embodiment 2

FIG. 3

In Embodiment 2 of the present invention, as illustrated in FIG. 3, the partial offsetting of the air conditioner external heat exchanger 12 and the fuel cell cooling heat exchanger 11 to each other is performed by partially offsetting the air conditioner external heat exchanger 12 and the fuel cell cooling heat exchanger 11 to each other in a right-and-left direction of the vehicle. In Embodiment 2 of the present invention, the fan shroud 17 needs to be necessarily provided.

The portion 11a of the fuel cell cooling heat exchanger 11 extending in the front view beyond the end of the air conditioner external heat exchanger 12 opposite the high-temperature portion 12a extends from the fan shroud 17 in the right-and-left direction of the vehicle.

With effects and technical advantages of Embodiment 2 of the present invention, since the portion 11a of the fuel cell cooling heat exchanger 11 extending in the front view beyond the end of the air conditioner external heat exchanger 12 opposite the high-temperature portion 12a extends from the fan shroud 17 in the right-and-left direction of the vehicle, the wind which has passed through the air conditioner external heat exchanger 12 does not flow through the portion 11a of the fuel cell cooling heat exchanger 11. As a result, the temperature difference between the water and the air (wind) at the portion 11a of the fuel cell cooling heat exchanger 11 can be large, so that the heat dissipation is improved.

Embodiment 3

FIGS. 4 and 5

In Embodiment 3 of the present invention, as illustrated in FIGS. 4 and 5, the partial offsetting of the air conditioner external heat exchanger 12 and the fuel cell cooling heat exchanger 11 from each other is performed by partially offsetting the air conditioner external heat exchanger 12 and the fuel cell cooling heat exchanger 11 from each other in a up-and-down (vertical) direction of the vehicle. The portion 11a of the fuel cell cooling heat exchanger 11 extending in the front view beyond the end of the air conditioner external heat exchanger 12 opposite the high-temperature portion 12a extends beyond the end of the air conditioner external heat exchanger 12 opposite the high-temperature portion 12a and from the fan shroud 17 in the downward direction. The vehicle-running wind flowing through the air take-in opening 18 located below the bumper directly contacts the portion 11a.

With effects and technical advantages of Embodiment 3 of the present invention, since the core tubes of the air conditioner external heat exchanger 12 usually extend in the right-and-left direction, the boundary between the high-temperature portion 12a and the low-temperature portion 12b can be caused to correspond to the upper surface of the fuel cell cooling heat exchanger 11, so that the offsetting of the high-temperature portion 12a only from the fuel cell cooling heat exchanger 11 is easily performed.

Further, since the portion 11a of the fuel cell cooling heat exchanger 11 is disposed lower than the air conditioner external heat exchanger 12 and the portion 11a is located on the rear side of the air take-in opening 18 below the bumper so that much vehicle-running wind can cool the portion 11a, heat dissipation of the portion 11a of the fuel cell cooling heat exchanger 11 is easily improved.

The invention claimed is:

1. A cooling apparatus of a fuel cell vehicle comprising:
a cooling fan;
a fuel cell cooling heat exchanger; and
an air conditioner external heat exchanger having a high-temperature portion,
wherein the air conditioner external heat exchanger is disposed upstream of the fuel cell cooling heat exchanger in a passing air flow direction, and the air conditioner external heat exchanger and the fuel cell cooling heat exchanger are partially offset from each other so that the high-temperature portion of the air conditioner external heat exchanger is not overlapped with the fuel cell cooling heat exchanger in a front view taken from a front side of the vehicle, and
wherein the cooling fan is disposed downstream of the fuel cell cooling heat exchanger and a fan shroud of the cooling fan surrounds the contour of the air conditioner external heat exchanger.

2. A cooling apparatus of a fuel cell vehicle comprising:
a cooling fan;
a fuel cell cooling heat exchanger; and
an air conditioner external heat exchanger having a high-temperature portion,
wherein the air conditioner external heat exchanger is disposed upstream of the fuel cell cooling heat exchanger in a passing air flow direction, and the air conditioner external heat exchanger and the fuel cell cooling heat exchanger are partially offset from each other so that the high-temperature portion of the air conditioner external heat exchanger is not overlapped with the fuel cell cooling heat exchanger in a front view taken along a cooling wind flowing to the fuel cell cooling heat exchanger, and
wherein the cooling fan is disposed downstream of the fuel cell cooling heat exchanger and a fan shroud of the cooling fan surrounds the contour of the air conditioner external heat exchanger.

3. A cooling apparatus of a fuel cell vehicle according to claim 1, wherein the fuel cell cooling heat exchanger has a portion extending out from an end, opposite the high-temperature portion, of the air conditioner external heat exchanger in the front view, and the extending-out portion of the fuel cell cooling heat exchanger is disposed outside the fan shroud so that the extending-out portion is cooled by a vehicle-running wind only.

4. A cooling apparatus of a fuel cell vehicle according to claim 1, wherein coolant of the air conditioner is $CO_2$ and the high-temperature portion of the air conditioner external heat exchanger is defined as a portion where a temperature of the $CO_2$ coolant is higher than a temperature of fuel cell cooling water.

5. A cooling apparatus of a fuel cell vehicle according to claim 1, wherein the fuel cell cooling heat exchanger includes a coolant inlet and a coolant outlet, the coolant inlet of the fuel cell cooling heat exchanger being located on a higher-temperature side of air having passed through the air conditioner external heat exchanger.

6. A cooling apparatus of a fuel cell vehicle according to claim 2, wherein the fuel cell cooling heat exchanger includes a coolant inlet and a coolant outlet, the coolant inlet of the fuel cell cooling heat exchanger being located on a higher-temperature side of air having passed through the air conditioner external heat exchanger.

* * * * *

UNITED STATES PATENT AND TRADEMARK OFFICE
CERTIFICATE OF CORRECTION

PATENT NO. : 7,730,734 B2 Page 1 of 1
APPLICATION NO. : 11/578551
DATED : June 8, 2010
INVENTOR(S) : Jun Hoshi et al.

It is certified that error appears in the above-identified patent and that said Letters Patent is hereby corrected as shown below:

On the Cover Page, Col. 1: Change "(86) PCT No.: PCT/JP2006/001393" to

--(86) PCT No.: PCT/JP2006/301393--.

Signed and Sealed this

Seventeenth Day of August, 2010

David J. Kappos
*Director of the United States Patent and Trademark Office*